(12) United States Patent
Thomsen

(10) Patent No.: US 12,298,860 B2
(45) Date of Patent: May 13, 2025

(54) SYSTEMS AND METHODS FOR BACKING UP DATA

(71) Applicant: SAP SE, Walldorf (DE)

(72) Inventor: Dirk Thomsen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/487,515

(22) Filed: Oct. 16, 2023

(65) Prior Publication Data

US 2025/0123929 A1    Apr. 17, 2025

(51) Int. Cl.
| | | |
|---|---|---|
| G06F 16/20 | (2019.01) | |
| G06F 11/14 | (2006.01) | |
| G06F 16/23 | (2019.01) | |
| G06F 21/60 | (2013.01) | |

(52) U.S. Cl.
CPC ........ G06F 11/1461 (2013.01); G06F 21/602 (2013.01); *G06F 16/20* (2019.01); *G06F 16/23* (2019.01); *G06F 2201/84* (2013.01)

(58) Field of Classification Search
CPC ............... G06F 11/1461; G06F 21/602; G06F 2201/84; G06F 16/20; G06F 16/23; G06F 16/25; G06F 16/2308; G06F 16/2315; G06F 16/2322; G06F 16/2329; G06F 16/2336; G06F 16/2343

USPC ........................................................ 707/654
See application file for complete search history.

(56) References Cited

U.S. PATENT DOCUMENTS

| | | | |
|---|---|---|---|
| 10,310,946 B2 * | 6/2019 | Thomsen | G06F 11/2038 |
| 10,360,111 B2 * | 7/2019 | Thomsen | G06F 12/0868 |
| 2012/0221826 A1 * | 8/2012 | Haines | G06F 3/0611 |
| | | | 711/170 |
| 2018/0253467 A1 * | 9/2018 | Gurajada | G06F 11/1471 |
| 2018/0260425 A1 * | 9/2018 | Thomsen | G06F 11/1474 |
| 2019/0340017 A1 * | 11/2019 | Scheuer | G06F 16/2379 |
| 2021/0303199 A1 * | 9/2021 | Horspool | G06F 3/0614 |
| 2022/0092025 A1 * | 3/2022 | Vaideeswaran | G06F 3/0619 |
| 2022/0382712 A1 * | 12/2022 | Thomsen | H04L 9/0894 |

\* cited by examiner

*Primary Examiner* — Michael Pham
(74) *Attorney, Agent, or Firm* — Fountainhead Law Group, PC

(57) ABSTRACT

Embodiments of the present disclosure include techniques for backing up data. In one embodiment, a plurality of read requests are issued. In response to the read requests, a plurality of data pages are retrieved. The plurality of data pages are stored in a plurality of buffers. During said storing, for each data page, an indication that storage of a particular data page of the plurality of data pages has been completed is generated. In response to an indication that storage of a particular data page has been completed, the data page is processed with one of a plurality of jobs, where a plurality of data pages are processed by the plurality of jobs in parallel.

16 Claims, 5 Drawing Sheets

SYSTEMS AND METHODS FOR BACKING UP DATA

BACKGROUND

The present disclosure relates generally to software systems, and in particular, to systems and methods for backing up data.

Computer systems, such as database systems, may crash during operations, resulting in loss of data. Data can be backed up such that it can be recovered to mitigate such data loss. One way to backup data is to create a snapshot of a database. The snapshot may be stored in a data volume on a disk drive, for example. The data in the snapshot may be validated before it is stored onto backup media. The data on the backup media may then be used to recover the system at some later point in time.

The amount of data being stored by modern computer systems has increased over time. While computer processing speeds have also increased over time, it has not kept up with the increase in the amount of data in some situations. Accordingly, the process for backing up the computer system has started to take longer and longer over time in such situations.

The present disclosure addresses these and other challenges and is directed to techniques for secure remote connections to third party computer systems.

DETAILED DESCRIPTION

Described herein are techniques for backing up data. In the following description, for purposes of explanation, numerous examples and specific details are set forth in order to provide a thorough understanding of some embodiments. Various embodiments as defined by the claims may include some or all of the features in these examples alone or in combination with other features described below, and may further include modifications and equivalents of the features and concepts described herein.

As mentioned above, the amount of data being stored by modern computer systems has increased over time. In some cases storage Input/Output (I/O) hardware speeds have also improved. And while computer processing speeds have also increased over time, processing speeds may not keep up with the increase in the amount of data and I/O throughput in some situations. Accordingly, the process for backing up the computer system has started to take longer and longer over time in such situations.

As a high level example, a backup process may involve many data retrieval operations, data storage operations, and computationally intensive operations such as decryption and checksum validation. When the amount of data to be backed up is large, the decryption and checksum calculation operations for a snapshot may be slow compared to the I/O operation of reading the snapshot. In this situation, the I/O speed is no longer the bottleneck of the backup process, even though I/O speed was sometimes the bottleneck in the past. Instead, the decryption (if encryption is used) and checksum calculation processes have become the bottleneck in some situations. For example, a computer system may not be able to decrypt data pages and calculate checksums for those data pages as quickly as the I/O system can read the data pages of the snapshot from the data volume on which the snapshot is stored.

To address these performance issues and others, the present disclosure provides techniques for backing up data using and plurality of adaptively managed jobs which perform the decryption and checksum calculation processing in parallel with each other. The number of jobs executing in parallel is adaptively managed to avoid jobs sleeping by keeping job queues non-empty. Features and advantages of these techniques include improved performance of the backup process as reflected by quicker processing compared to execution without jobs and use of fewer computer resources compared to non-adaptive job processing. As used herein, "job" processing refers to execution of instructions by each "job" in a separate thread, in the background, where multiple jobs can execute in parallel. These improved backup techniques are described in further detail below.

Figure 1:
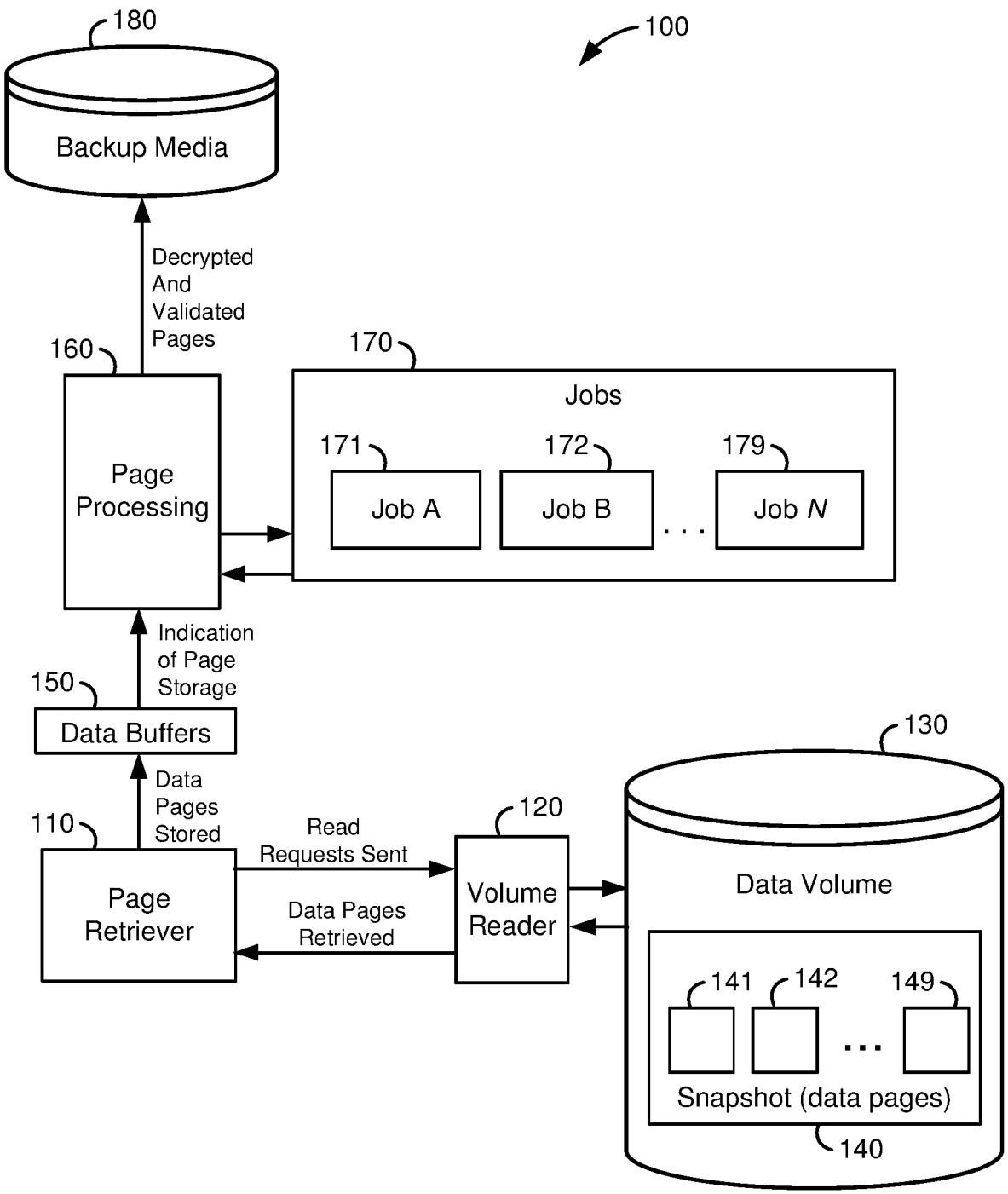
FIG. 1 illustrates a system for backing up data according to an embodiment.

FIG. 1 illustrates a system 100 for backing up data according to an embodiment. The system 100 shown in FIG. 1 may be implemented as software components of a computer system. The computer system may be a database manager system, for example. The backup process may be performed by the computer system executing the software components.

The system 100 is configured to perform a backup of data by first storing a snapshot 140 (e.g., a snapshot of a database) of data pages 141, 142, 149 to a data volume 130. In FIG. 1, the snapshot 140 includes a plurality of data pages 141, 142, 149 with ellipsis (" . . . ") to indicate that that other data pages may be present but omitted from the drawing. This omission is done for simplicity of illustration. The snapshot may include any number of data pages and the number of pages may depend on the size of the data pages and the overall size of the snapshot 140.

As an overview of the backup process, once the snapshot 140 has been stored the data is read into a plurality of data buffers 150, from which validation and other data page processing 160 is performed. This processing may be performed using jobs 170. After processing, the data pages are then stored into backup media 180, which can later be used for recovery of the data. The details of this data backup process are provided below.

As mentioned above, pages of the snapshot 140 are stored in the data volume 130. The data volume 130 may be a persistent storage device. The snapshot may be a snapshot of a database (not shown in FIG. 1), such as an in-memory database, for example. The data volume 130 may be accessible for read and write operations through a volume reader 120 I/O software component.

To retrieve the data pages (e.g., 141, 142, 194 etc.) once the snapshot 130 is completed, a backup channel for communicating with the volume reader 120 may be instantiated. The page retriever 110 is such a backup channel. In addition, one or more of the plurality of data buffers 150 can be allocated to be filled with the data pages as they are retrieved. The data buffers 150 may be allocated in a heap memory (e.g., 1 GB). In some embodiments, the data buffers 150 are allocated in dynamic random access memory.

The page retriever 110 is configured to issue a plurality of read requests (e.g., requests for data pages 141, 142, 149 and so on of the snapshot 140) to the volume reader 120. These read requests may be issued by calling a receive method of the backup channel, which may receive a buffer and buffer size as parameters, for example.

The read requests send by the page retrieved are issued to a volume reader 120 software component. The volume reader 120 may be configured to retrieve the plurality of data pages (from the data volume 130) in response to the plurality of read requests made by the page retriever 110. The volume reader 120 is configured to read data from the data from the data volume 130 using I/O hardware. Each read request may be a request for a particular data page. The reads may be asynchronous read I/O of the data pages.

The volume reader 120 is configured to provide the data pages to the page retriever 110 as the data pages are read from the data volume 130. The page retriever 110 is configured to store the plurality of data pages in a plurality of buffers. During this storing of the data pages in the buffer 150, for each data page, an indication is generated that storage of a particular data page of the plurality of data pages has been completed. This indication is provided to a page processing 160 software component.

The page processing 160 component is configured to validate the data pages before they are stored in the backup media 180. This validation can include a checksum calculation. If the data pages are encrypted, then the validation also includes decrypting the data pages first. The calculation of the checksum may be more computationally difficult or require more computation time compared to the operations used to read the data pages from the data volume, especially when decryption is also required. In prior backup systems, data pages could be read from the data volume 130 faster than the computer system could process the data pages (e.g., perform decryption and checksum calculation).

Features and advantages of the backup techniques described in the present disclosure include performing backup more quickly compared to prior backup techniques through the utilization of jobs 170 to perform decryption and checksum calculation operations. In response to an indication that storage of a particular data page in a buffer has been completed, the data page can be processed with one of a plurality of jobs, wherein a plurality of data pages is processed by the plurality of jobs in parallel.

In FIG. 1, Job A 171, Job B 172, and Job N 179 are shown with ellipsis (" . . . ") to indicate that that other jobs may be present but omitted from the drawing. This omission is done for simplicity of illustration. The plurality of jobs may include any number of jobs as appropriate. In some embodiments a maximum number of jobs may be set.

The page processing 160 component may be configured to initiate or task jobs to perform a checksum calculation on the plurality of data pages or to perform both decryption of one or more data pages as well as checksum calculation. Other operations may also be performed by the jobs 170. In order to task the jobs 170, the page processing 160 component is configured to send a plurality of tasks to a plurality of job queues, where each job has a corresponding job queue (not shown in FIG. 1). Each job retrieves tasks from the job queue for execution, and each task moves a data page to the buffer.

If a checksum calculation indicates that the data page is invalid, a read I/O (e.g., read request) is re-triggered. In some cases, if a validation of a data page has failed multiple times (3 time, for example), then an exception may be thrown from the backup channel in order to notify the caller about the failure.

After the data pages are processed by the jobs 170, the data pages are stored into the backup media 180 for use in any later recovery operations. Accordingly, the backup process is complete and performed more quickly and more efficiently than prior backup techniques due to the use of jobs 170 and adaptive configuration of jobs. Adaptive configuration of jobs is described in further detail below with respect to FIG. 3.

Figure 2:
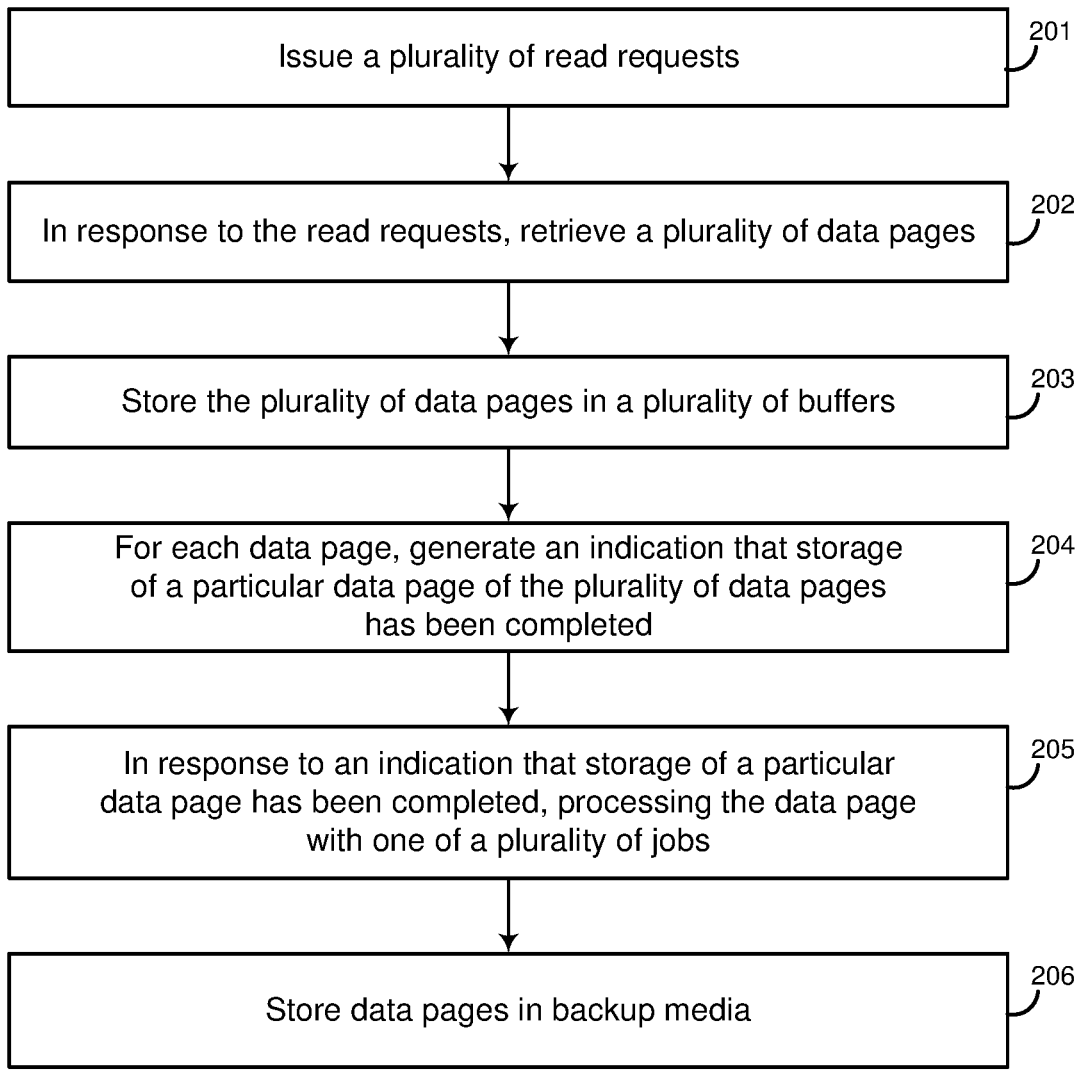
FIG. 2 illustrates a method for backing up data according to an embodiment.

FIG. 2 illustrates a method 200 for backing up data according to an embodiment. The method 200 may be a computer implemented method. For example, the method 200 may be implemented by a database management system. The method 200 may be implemented using software components such as the components described above with respect to FIG. 1.

At 201, issue a plurality of read requests. The read requests may be issued using a page retriever software component such as a receive method of a backup channel, as described above. The read requests may be issued to a volume reader I/O component configured to access a data volume, for example.

At 202, in response to the read requests, retrieve a plurality of data pages. In some embodiments, the data pages are retrieved from a persistent storage device. The reads may be performed using asynchronous read I/O.

At 203, store the plurality of data pages in a plurality of buffers. In some embodiments, the plurality of buffers is in a dynamic random access memory. The data buffers 150 may be allocated in a heap memory (e.g., 1 GB). In some embodiments, the data buffers 150 are allocated in dynamic random access memory.

At 204, during said storing, for each data page, generating an indication that storage of a particular data page of the plurality of data pages has been completed. In some embodiments, the issuing, retrieving, and storing steps are performed by a database management system.

At 205, in response to an indication that storage of a particular data page has been completed, processing the data page with one of a plurality of jobs, wherein a plurality of data pages is processed by the plurality of jobs in parallel. In some embodiments, the processing comprises performing a checksum on the plurality of data pages. In some embodiments, the processing comprises decrypting the plurality of data pages. In some embodiments, the plurality of jobs comprises a maximum number of jobs.

In some embodiments, a plurality of tasks are sent to a plurality of job queues, where each job has a corresponding job queue. Each of the jobs may retrieve tasks from its corresponding job queue for execution. Each task may move a data page to the buffer.

The jobs may be adaptively managed to increase efficient use of computing resources. In some embodiments, a count is generated for a number a times each job does not have any tasks in a corresponding job queue. Furthermore, when the count increases above a first value, one or more jobs of the plurality of jobs may be inactivated. This reduces the delay in waking jobs up. In some embodiments, a count is generated for a number of tasks in the plurality of job queues. Furthermore, when the count increases above a first value, activating one or more additional jobs. Activating more jobs enables the tasks to be performed more quickly.

At 206, store data pages in backup media. As such, the data pages are available for a recovery operation later. Features and advantages of this method include backing up data more quickly using a plurality of jobs (e.g., as opposed to using a single threaded operation) and more efficiently through adaptive allocation of jobs.

Figure 3:
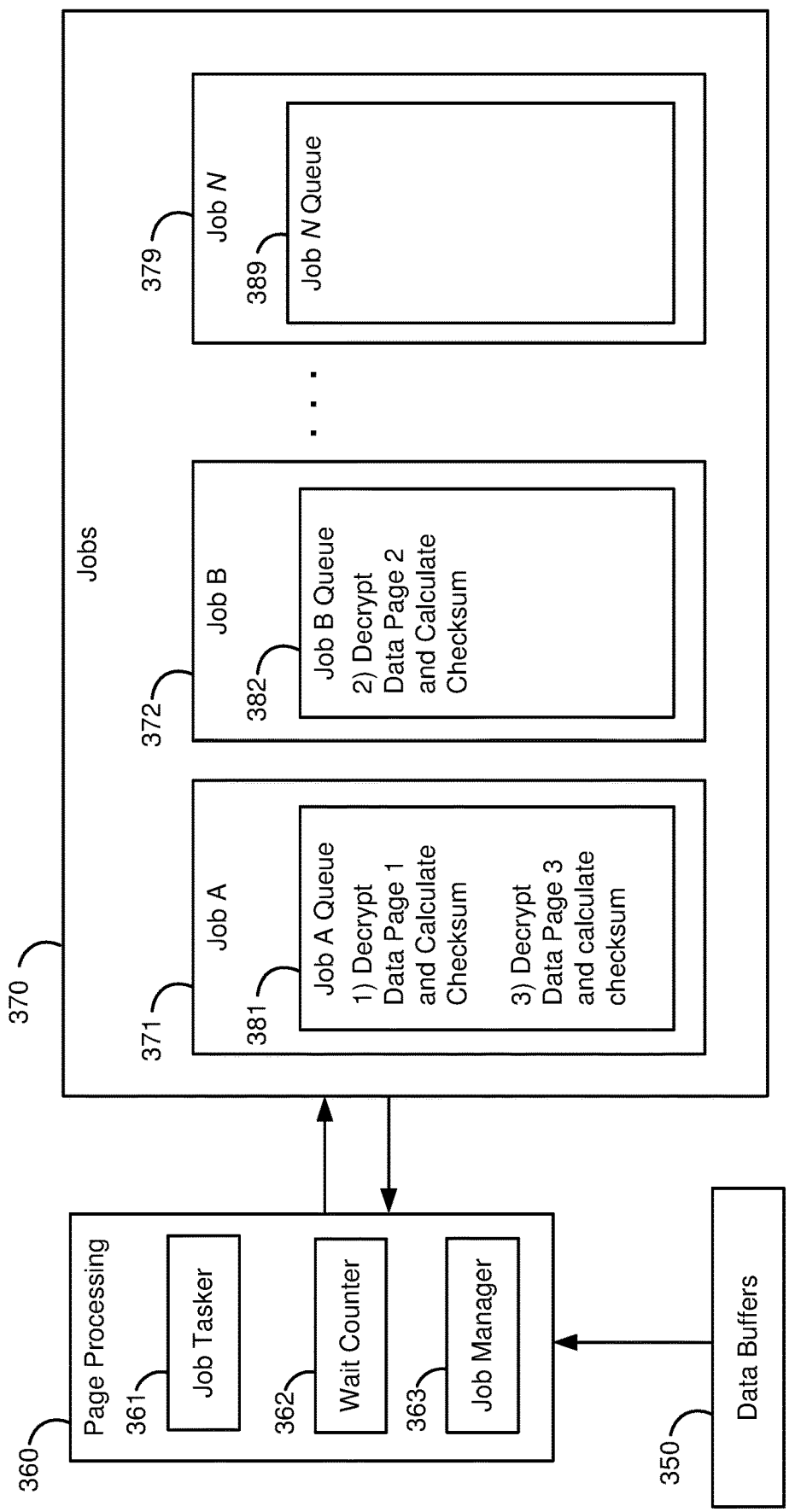
FIG. 3 illustrates an example of job tasking and management according to another embodiment.

FIG. 3 illustrates an example of job tasking and management according to another embodiment. Job taking and management is handled by a page processing 360 software component, which is configured similar to the page processing 160 component described above with respect to FIG. 1. For instance, the page processing 360 component is configured to validate data pages stored in data buffers 350 before they are stored in the backup media. This validation can include a checksum calculation. Furthermore, if the data pages are encrypted, then the validation also includes decrypting the data pages first.

In order to process the data pages more quickly, the page processing 360 component is configured to utilize jobs 370 to perform decryption and checksum calculation operations. To do this, the page processing 360 component includes a job tasker 361 software component, a wait counter 362 software component, and a job manager 363 software component.

The job tasker component 361 is configured to obtain an indication that storage of a particular data page in one of the data buffers 350 has been completed. This means that the data page is ready to be processed with one of a plurality of jobs 370. The jobs 170 are configured to be able to process a plurality of data pages in parallel with the processing tasks being spread across multiple jobs.

In FIG. 3, Job A 371, Job B 372, and Job N 379 are shown with ellipsis (" . . . ") to indicate that that other jobs may be present but omitted from the drawing. This omission is done for simplicity of illustration. The plurality of jobs may include any number of jobs as appropriate. In some embodiments a maximum number of jobs may be set.

The job tasker 361 component may be configured to initiate or task jobs to perform a checksum calculation on the plurality of data pages or to perform both decryption of one or more data pages as well as checksum calculation. Other operations may also be performed by the jobs 170. In order to task the jobs 370, the job tasker 361 component is configured to send a plurality of tasks to a plurality of job queues, where each job has a corresponding job. As shown in FIG. 3, Job A 371 has a Job A Queue 381, Job B 372 has a Job B Queue 382, and Job N 379 has a Job N Queue 389. Each job 371, 372, 279 retrieves tasks from the respective job queue 381, 382. 389 for execution. In some embodiments, each task moves a data page to the buffer.

As an example, for purposes of illustration, there are 3 tasks to be performed. The first task is to decrypt data page 1 and calculate its checksum. The second task is to decrypt data page 2 and calculate its checksum. The third task is to decrypt data page 3 and calculate its checksum. The Job A Queue 381 and Job B Queue 382 each have these tasks assigned to them. In this example, the tasks are distributed in a round such that Job A 371 is assigned task 1 and task 3, while Job B 372 is assigned task 2. The Job A Queue 381 includes the following tasks:
1) Decrypt Data Page 1 and Calculate Checksum (first task)
2) Decrypt Data Page 3 and Calculate Checksum (third task)

The Job B Queue 382 includes the following tasks:
1) Decrypt Data Page 1 and Calculate Checksum (second task)

The Job N Queue 389 is shown along with ellipsis (" . . . ") to illustrate that there may be any number of jobs (up to a predefined maximum number of jobs in some embodiments) which each have their own corresponding queue.

In this example, for purposes of illustration, Job A 371 is tasked to the first and third tasks while job B 372 is tasked with the third task. Since Job A 371 has two tasks and Job B 372 has only one task, Job A 371 will be able to continue working after it completes the first task by going on to process the third task. However, once Job B 372 finishes the second task, it has no more tasks in its queue. Unless Job B 371 is assigned another task in the mean time, it may need to wait and go to "sleep" (e.g., cease active processing and wait for a trigger or other wakeup call) until another task is added to its queue. In this case, the page processing 360 component may be notified that job B 371 needs to wait, and the page processing 380 component may increase a wait counter 362 by 1. The wait counter 362 is a counter of how many times the jobs 370 have needed to wait.

The number of numbers that a job 370 has waited is tracked using the wait counter 362 because jobs waiting causes inefficiency due to the delays as a result of the job sleeping, periodically waking up to check if it has tasks in its queue, and then beginning to process any tasks. For example, if a job is waiting on a semaphore (e.g., a synchronization primitive that controls access to a common resource) to be triggered to do something, then the job needs to wake up. However, if the system is busy it might take a while for the job to be woken up.

Because of such delays it is not always more efficient to process tasks using more jobs. At a certain point, increasing the number of jobs reduces efficiency as the delays from sleeping and waking up become longer than the improved processing power available from the increased number of jobs.

Thus, one difficulty in achieving processing efficiency is finding the most effective number of jobs to use. If the page processing 360 component does not utilize enough jobs 370, then it may not speed up the processing of the data pages enough. However, if the page processing 360 component utilizes too many jobs, then the performance may actually decrease at some point because it cannot keep all of the jobs busy and running, resulting in waits (sleeping and waking up) and delays as already described.

The job manager 363 component is configured to determine an efficient number of jobs 370 to utilize based on the wait counter 362. The wait counter 362 is configured to generate a count for a number a times each job does not have any tasks in a corresponding job queue. The job manager 363 is configured to inactivate one or more jobs of the plurality of jobs 370 when the count increases above a first value. The job manager is also configured to activate one or more additional jobs 370 when the count increases above a first value, activating one or more additional jobs. Further details on the wait counter 362 and job activation and inactivation are described below.

As mentioned above, the wait counter 362 may be used to count how often one of the jobs 370 fall asleep. For example, a jobs may have a signal In/Out queue for the tasks to be executed and if the queue is empty then the job waits to be triggered to be woken up to begin executing a newly added task in its queue. For example, a job can have a semaphore and a signal In/Out queue where signal objects can be added. In some embodiments the Signal In/Out queue may be operated by several threads without taking locks (e.g., a mutex or another synchronization primitive).

An example implementation is now described. As described above, data pages are stored into buffers. A backup channel may trigger read I/O such that the file system reads the data page from disk (e.g., from the data volume) into a particular position in the buffer. After the data page is stored into that position in the buffer, an I/O completion event may be triggered to indicate that this operation was completed. Then, the backup channel may issue an acknowledge (ACK) including an object into the signal I/O queue of one of the jobs 370 in order to indicate to that job that there is work for the job to do. The object inserted into the signal I/O queue may include information of the position in the buffer containing the data page, which is now available to be processed by the job. After this information is added to the signal I/O queue, the semaphore of that job is signaled, the job is woken up, and the job will get anything out of its signal I/O queue and process it.

If a job would process data and then afterwards wait on the semaphore again, it may fall asleep, and the later operation of waking up would be a performance penalty as previously discussed. It would be more efficient for the job to be triggered, execute whatever task is in its queue, and after finishing execution there are new tasks in its queue to execute so that it does not have to sleep. Thus, the job is busy with tasks all the time.

If jobs are frequently waiting, based on the wait counter 363, then the job manager 363 reduces the number of jobs 370 being used. On the other hand, if the number of tasks in the queues of the jobs 370 is increasing over time, the job manager 363 allocates additional jobs to help process tasks. Thus, the job manager 363 allocates jobs 370 in a self-adaptive manner. In some embodiments, the job manager 363 may have a predetermine maximum number of jobs that it uses. It is advantageous to perform self-adaptive job allocation as deallocating jobs reduces delays caused by waiting when there are too many jobs utilized and allocating additional jobs reduces overall processing time when there are too few jobs to process the number of tasks being created.

Figure 4:
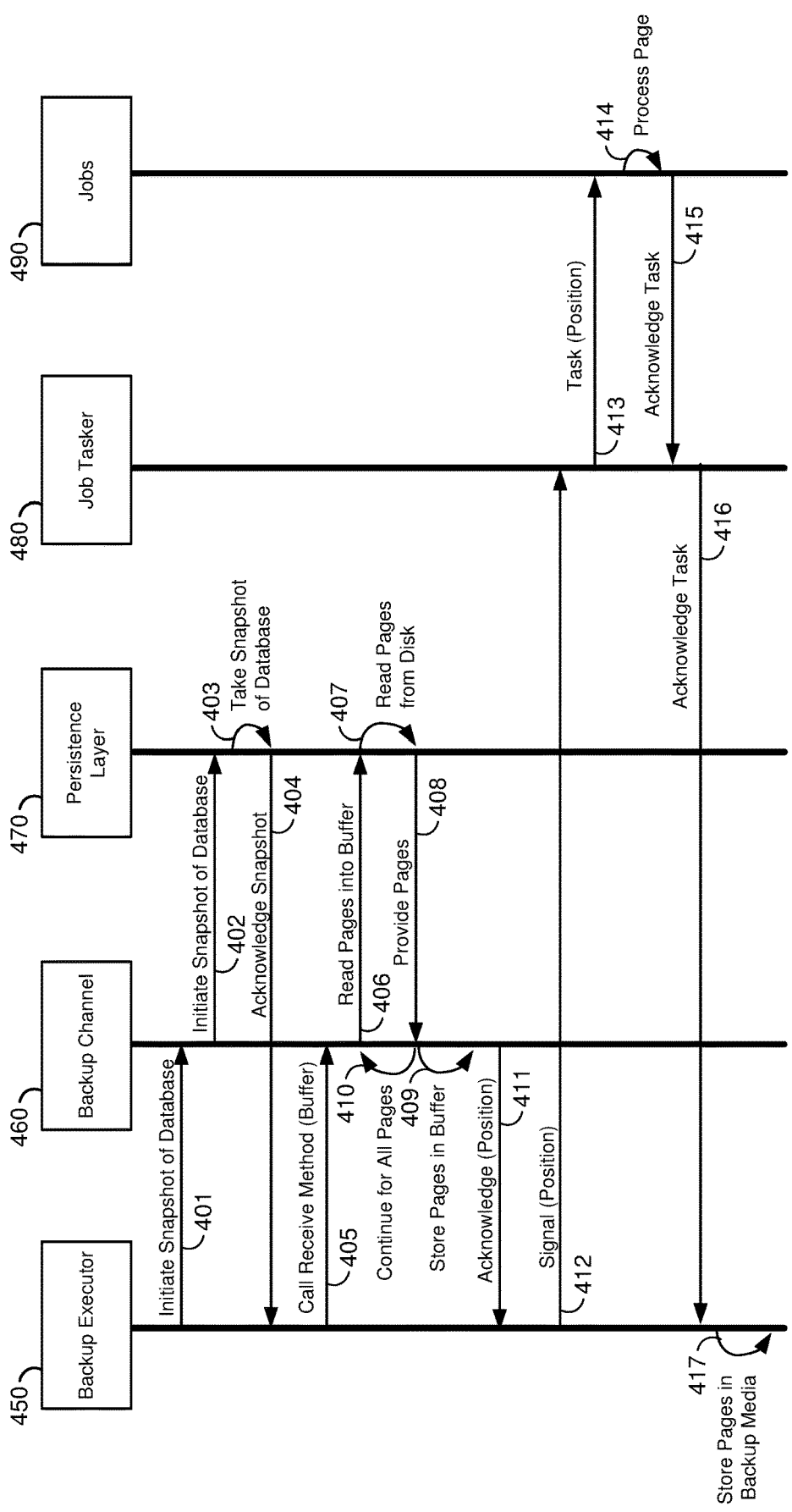
FIG. 4 illustrates an example flow diagram for backing up data in a database according to another embodiment.

FIG. 4 illustrates an example flow diagram 400 for backing up data in a database according to another embodiment. The flow diagram 400 illustrates communications between and operations performed by a backup executor 450, a backup channel 460, a persistence layer 470, a job tasker 480, and jobs 490, which are software components executable by a computer system. The communications and operations performed in the diagram 400 illustrate an example implementation of the backup techniques described above with respect to FIG. 1-3.

At 401, the backup executor 450 initiates a snapshot to be taken of a database by calling the backup channel 460, which is in communication with the persistence layer 470. In this example, for ease of illustration, the persistence layer 470 may be in communication with both the database and with a data volume for storing the snapshot. In other embodiments the database and the data volume may have separate persistence layers. For example, the database may be an in-memory database while the data volume may be disk storage.

At 402, the backup channel 460 initiates a snapshot of the database to be taken by communicating with the persistence layer 470. The snapshot consists of a plurality of data pages.

At 403, the persistence layer 470 takes a snapshot of the database by reading the data in the database (e.g., at a particular time based on time stamps) and stores it in a data volume.

At 404, the persistence layer 470 sends an acknowledgement to the backup channel 460 indicating that the snapshot has been taken.

At 405, the backup executor 450 calls a receive method of the backup channel 460 and provides a buffer to be filled with the data pages of the snapshot. The receive method gets the buffer from the backup executor 450.

At 406, the receive method of the backup channel 460 calls into the persistency layer 470 to read the pages of the snapshot into the buffer. As many pages are read from the persistency layer 470 as fit into the buffer. Once the buffer is full, the backup executor 450 may call the receive method and provide another buffer to be filled with pages of the snapshot until the entire snapshot is stored into one or more buffers.

At 407, the persistence layer 470 reads pages from the data volume disk.

At 408, the persistence layer 470 provides the pages to the backup channel 460.

At 409, the backup channel 460 stores the pages into the buffer.

At 410, the backup channel 460 continues to read pages into the buffer until all pages for that buffer have been stored into the buffer.

At 411, the backup channel 460 sends an acknowledgement to the backup executor 450 indicating a position of the page in the buffer. An acknowledgement is sent for each page read into the buffer.

At 412, the backup executor 450 sends a signal including the position within the buffer to the job tasker 480. The signal may also indicate a particular task to be performed on the data page stored in that position. The task may be to validate the data page by performing a checksum calculation. The task may also be to perform decryption of the data page. In some cases, there may be tasks to perform both decryption and validation.

At 413, the job tasker 480 tasks a particular jobs of a plurality of jobs 490 with the task of processing the data page stored at the particular position within the buffer.

At 414, the particular job processes the page.

At 415, the particular job 490 acknowledges that the task is complete. If the jobs queue is empty the acknowledgement can also indicate that that its queue is empty, meaning that the job will wait and go to sleep. As mentioned above, a count of such waits may be tracked in order to adaptively manage the number of jobs being operated in parallel.

At 416, the job tasker 480 acknowledges that the task is complete to the backup executor 450.

At 417, the backup executor 450 stores the page in a backup media. This process continues until each data page of the snapshot has been read into a buffer, processed by a job, and then stored into the backup media.

Figure 5:
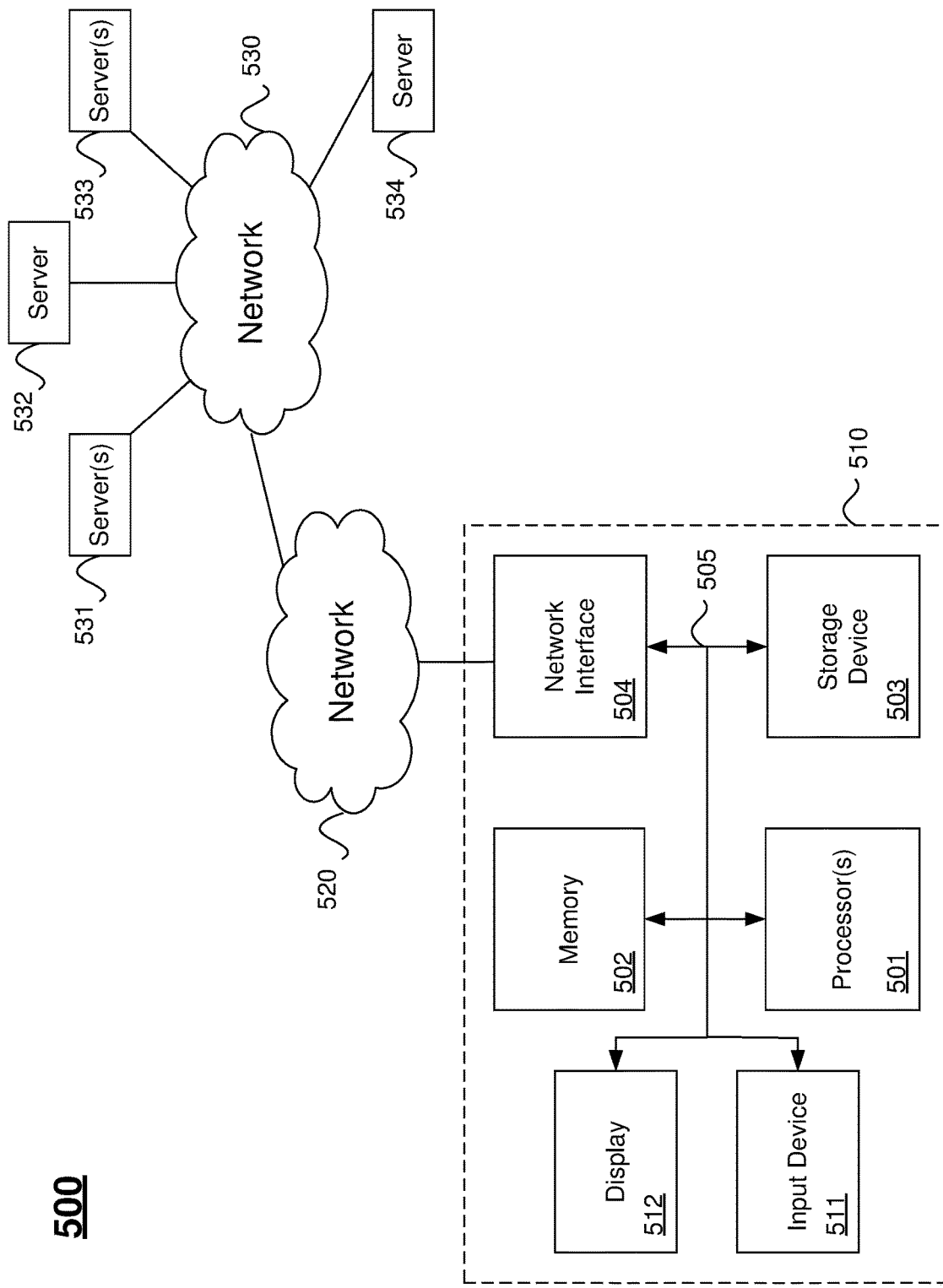
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform a method as described herein and in the following examples. In another embodiment, the present disclosure includes a non-transitory computer-readable medium storing computer-executable instructions that, when executed by at least one processor, perform a method as described herein and in the following examples.

Some embodiments provide a method of backing up data. The method includes issuing a plurality of read requests. The method further includes, in response to the read requests, retrieving a plurality of data pages. The method further includes, storing the plurality of data pages in a plurality of buffers. The method further includes, during said storing, for each data page, generating an indication that storage of a particular data page of the plurality of data pages has been completed. The method further includes, in response to an indication that storage of a particular data page has been completed, processing the data page with one of a plurality of jobs, wherein a plurality of data pages is processed by the plurality of jobs in parallel.

In some embodiments of the method, the processing comprises performing a checksum on the plurality of data pages.

In some embodiments of the method, processing comprises decrypting the plurality of data pages.

In some embodiments of the method, the method further comprising sending a plurality of tasks to a plurality of job queues, wherein each job has a corresponding job queue, wherein each job retrieves tasks from the job queue for execution, and each task moves a data page to the buffer.

In some embodiments of the method, the method comprises generating a count for a number a times each job does not have any tasks in a corresponding job queue, wherein when the count increases above a first value, inactivating one or more jobs of the plurality of jobs.

In some embodiments of the method, the method further comprises generating a count for a number of tasks in the plurality of job queues, wherein when the count increases above a first value, activating one or more additional jobs.

In some embodiments of the method, the plurality of jobs comprises a maximum number of jobs.

In some embodiments of the method, said issuing, retrieving, and storing steps are performed by a database management system.

In some embodiments of the method, the plurality of buffers is in a dynamic random access memory.

In some embodiments of the method, the data pages are retrieved from a persistent storage device.

Some embodiments provide a computer system comprising at least one processor and at least one non-transitory computer readable medium storing computer executable instructions. The instructions, when executed by the at least one processor, cause the computer system to perform a method of backing up data. The method includes issuing a plurality of read requests. The method further includes, in response to the read requests, retrieving a plurality of data pages. The method further includes, storing the plurality of data pages in a plurality of buffers. The method further includes, during said storing, for each data page, generating an indication that storage of a particular data page of the plurality of data pages has been completed. The method further includes, in response to an indication that storage of a particular data page has been completed, processing the data page with one of a plurality of jobs, wherein a plurality of data pages is processed by the plurality of jobs in parallel.

In some embodiments of the method, processing comprises performing a checksum on the plurality of data pages.

In some embodiments of the method, processing comprises decrypting the plurality of data pages.

In some embodiments of the method, the method further comprises sending a plurality of tasks to a plurality of job queues, wherein each job has a corresponding job queue, wherein each job retrieves tasks from the job queue for execution, and each task moves a data page to the buffer.

In some embodiments of the method, the method further comprises generating a count for a number a times each job does not have any tasks in a corresponding job queue, wherein when the count increases above a first value, inactivating one or more jobs of the plurality of jobs.

In some embodiments of the method, further comprises generating a count for a number of tasks in the plurality of job queues, wherein when the count increases above a first value, activating one or more additional jobs.

In some embodiments of the method, the plurality of jobs comprises a maximum number of jobs.

In some embodiments of the method, issuing, retrieving, and storing steps are performed by a database management system.

In some embodiments of the method, the plurality of buffers is in a dynamic random access memory.

Some embodiments provide a non-transitory computer-readable medium storing computer-executable instructions. The instructions, when executed by at least one processor, perform a method of backing up data. The method includes issuing a plurality of read requests. The method further includes in response to the read requests, retrieving a plurality of data pages. The method further includes storing the plurality of data pages in a plurality of buffers. The method further includes during said storing, for each data page, generating an indication that storage of a particular data page of the plurality of data pages has been completed. The method further includes in response to an indication that storage of a particular data page has been completed, processing the data page with one of a plurality of jobs, wherein a plurality of data pages is processed by the plurality of jobs in parallel.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method of backing up data comprising:
   issuing a plurality of read requests;
   in response to the read requests, retrieving a plurality of data pages of a snapshot of a database;
   storing the plurality of data pages in a plurality of buffers;
   during said storing, for each data page, generating an indication that storage of a particular data page of the plurality of data pages has been completed;
   in response to an indication that storage of a particular data page has been completed, processing the data page with one of a plurality of jobs, wherein a plurality of data pages is processed by the plurality of jobs in parallel, and wherein processing comprises decrypting the plurality of data pages and performing a checksum on the plurality of data pages,
   wherein reading the plurality of data pages is faster than said decrypting the plurality of data pages and performing the checksum on the plurality of data pages.

2. The method of claim 1, the method further comprising sending a plurality of tasks to a plurality of job queues, wherein each job has a corresponding job queue, wherein each job retrieves tasks from the job queue for execution, and each task moves a data page to the buffer.

3. The method of claim 1, further comprising generating a count for a number a times each job does not have any tasks in a corresponding job queue, wherein when the count increases above a first value, inactivating one or more jobs of the plurality of jobs.

4. The method of claim 1, further comprising generating a count for a number of tasks in the plurality of job queues, wherein when the count increases above a first value, activating one or more additional jobs.

5. The method of claim 1, wherein the plurality of jobs comprises a maximum number of jobs.

6. The method of claim 1, wherein said issuing, retrieving, and storing steps are performed by a database management system.

7. The method of claim 1, wherein the plurality of buffers is in a dynamic random access memory.

8. The method of claim 1, wherein the data pages are retrieved from a persistent storage device.

9. A computer system comprising:
   at least one processor;
   at least one non-transitory computer readable medium storing computer executable instructions that, when executed by the at least one processor, cause the computer system to perform a method of backing up data comprising:
   issuing a plurality of read requests;
   in response to the read requests, retrieving a plurality of data pages;
   storing the plurality of data pages in a plurality of buffers;
   during said storing, for each data page, generating an indication that storage of a particular data page of the plurality of data pages has been completed;
   in response to an indication that storage of a particular data page has been completed, processing the data page with one of a plurality of jobs, wherein a plurality of data pages is processed by the plurality of jobs in parallel, and wherein processing comprises decrypting the plurality of data pages and performing a checksum on the plurality of data pages,
   wherein reading the plurality of data pages is faster than said decrypting the plurality of data pages and performing the checksum on the plurality of data pages.

10. The computer system of claim 9, the method further comprising sending a plurality of tasks to a plurality of job queues, wherein each job has a corresponding job queue, wherein each job retrieves tasks from the job queue for execution, and each task moves a data page to the buffer.

11. The computer system of claim 9, further comprising generating a count for a number a times each job does not have any tasks in a corresponding job queue, wherein when the count increases above a first value, inactivating one or more jobs of the plurality of jobs.

12. The computer system of claim 9, further comprising generating a count for a number of tasks in the plurality of job queues, wherein when the count increases above a first value, activating one or more additional jobs.

13. The computer system of claim 9, wherein the plurality of jobs comprises a maximum number of jobs.

14. The computer system of claim 9, wherein said issuing, retrieving, and storing steps are performed by a database management system.

15. The computer system of claim 9, wherein the plurality of buffers is in a dynamic random access memory.

16. A non-transitory computer-readable medium storing computer-executable instructions that, when executed by at least one processor, perform a method of backing up data, the method comprising:
   issuing a plurality of read requests;
   in response to the read requests, retrieving a plurality of data pages;
   storing the plurality of data pages in a plurality of buffers;
   during said storing, for each data page, generating an indication that storage of a particular data page of the plurality of data pages has been completed;

in response to an indication that storage of a particular data page has been completed, processing the data page with one of a plurality of jobs, wherein a plurality of data pages is processed by the plurality of jobs in parallel, and wherein processing comprises decrypting the plurality of data pages and performing a checksum on the plurality of data pages, wherein reading the plurality of data pages is faster than said decrypting the plurality of data pages and performing the checksum on the plurality of data pages.

\* \* \* \* \*